Figure 1:
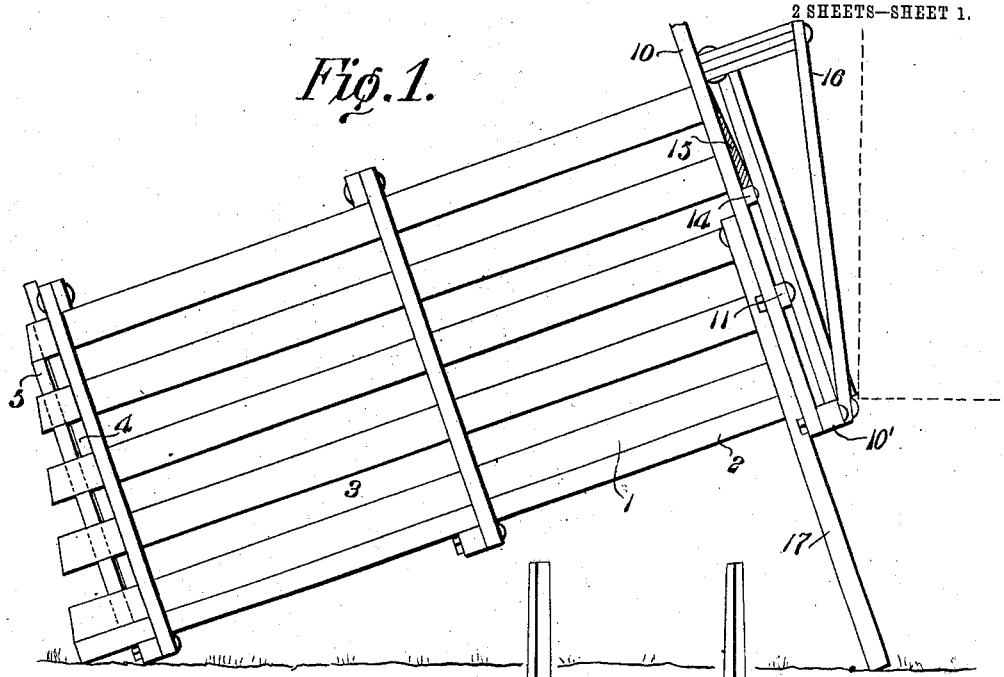

No. 850,197. PATENTED APR. 16, 1907.
W. E. WILLHOIT.
COMBINED TRAP, HOLDER, AND CHUTE FOR LIVE STOCK.
APPLICATION FILED NOV. 30, 1906.

2 SHEETS—SHEET 1.

WITNESSES:

William E. Willhoit INVENTOR

By C. A. Snow & Co.
ATTORNEYS

No. 850,197. PATENTED APR. 16, 1907.
W. E. WILLHOIT.
COMBINED TRAP, HOLDER, AND CHUTE FOR LIVE STOCK.
APPLICATION FILED NOV. 30, 1906.

2 SHEETS—SHEET 2.

WITNESSES:

William E. Willhoit
INVENTOR.
By C. A. Snow & Co.
ATTORNEYS

UNITED STATES PATENT OFFICE.

WILLIAM E. WILLHOIT, OF SHELBINA, MISSOURI, ASSIGNOR OF ONE-HALF TO JOHN N. SHERWOOD, OF KANSAS CITY, MISSOURI.

COMBINED TRAP, HOLDER, AND CHUTE FOR LIVE STOCK.

No. 850,197.  Specification of Letters Patent.  Patented April 16, 1907.

Application filed November 30, 1906. Serial No. 345,741.

*To all whom it may concern:*

Be it known that I, WILLIAM E. WILLHOIT, a citizen of the United States, residing at Shelbina, in the county of Shelby and State of Missouri, have invented a new and useful Combined Trap, Holder, and Chute for Live Stock, of which the following is a specification.

This invention has relation to a combined trap, holder, and chute for live stock; and it consists in the novel construction and arrangement of its parts, as hereinafter shown and described.

The device is especially adapted for handling hogs, although it may be used to advantage for handling sheep, calves, and like animals.

The object of the invention is to provide a device within which the animal may be entrapped and confined. Also in the case of hogs means is provided for holding the animal during the operation of setting a ring in his nose or slitting his nose and ears. Also means is provided for propping up one end of the device, so that it is transformed into a chute, whereby the animal or animals are forced to walk up the inclined device and enter a wagon, car, or other vehicle.

The device consists, primarily, of a body portion having a floor with vertical slatted sides. A vertically-slidable gate is provided at one end of the body, and at the opposite end of the body a horizontally-slidable gate is provided with lever mechanism for operating the last said gate. A pawl-and-ratchet device is connected with the last said gate for the purpose of positively holding the same in closed position. The last said gate is adapted to coöperate with a slidable section, which, together with the exit-gate, is provided with recesses adapted to receive the neck or the forward portion of the body of the animal for holding the same during an operation, as above indicated. At such time the pawl-and-ratchet mechanism holds the slidable gate in proper relation with the sliding section. The end of the body adjacent the horizontally-sliding gate is reduced in transverse area in order that the animal may not have excessive room for unnecessary threshing his unconfined members during an operation. Props are pivoted adjacent the last said end of the body and may be swung in vertical planes in order that their ends may engage the ground, and thus pitch the device at an incline. The confined animal is then driven up the floor of the body portion and forced into a wagon, rack, or car. When the device rests horizontally upon the ground, the said props are swung up upon their pivots and their free ends are elevated above the device. The reduced end is provided with fenders or frames, which are adapted to compensate for the difference in angle between the device and the wagon or car into which the animal is loaded, and thus prevent the escape of the animal at such points, and also properly space and brace the device against the wagon or car.

Figure 2:
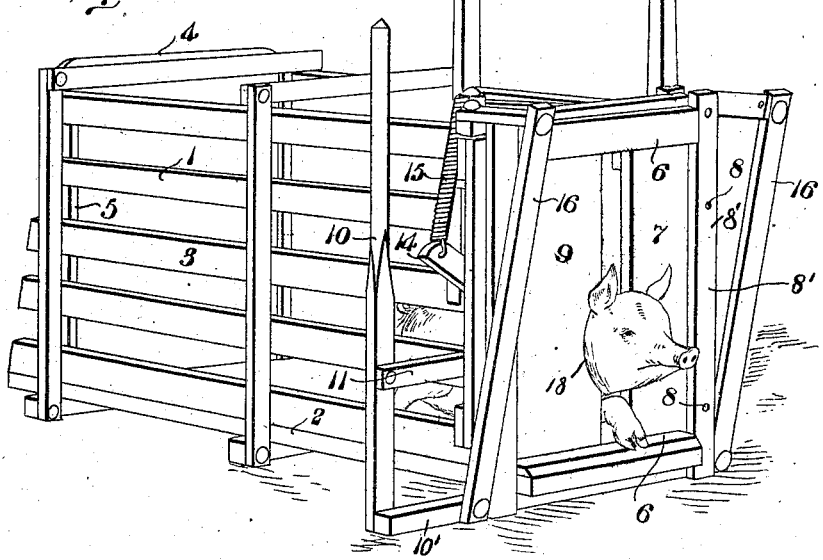
Figure 3:
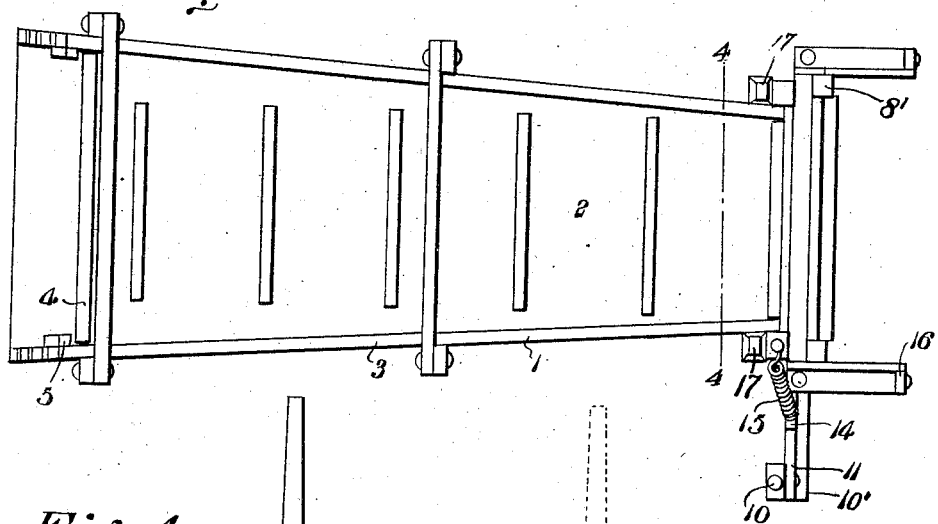
Figure 4:
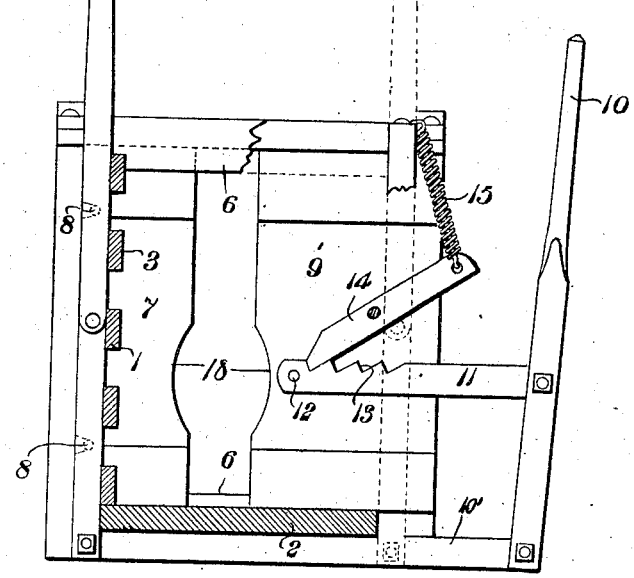

In the accompanying drawings, Figure 1 is a side elevation of the device in inclined position. Fig. 2 is a perspective view of the device holding an animal. Fig. 3 is a top plan view of the device, and Fig. 4 is a transverse sectional view of the device cut on the line 4 4 of Fig. 3.

The device consists of the body 1, which is provided with the floor 2 and the lateral vertical slatted sides 3. Said sides are converged toward each other at one end of the floor 2, and at the opposite end of the said floor the body 1 is provided with the vertically-slidable gate 4. Said gate operates in guides 5, provided upon the sides 3 3. The reduced end of the body 1 is provided with the upper and lower horizontal guides 6, one set of which is located upon the floor 2, and the other set connects the upper edges of the sides 3 3 together. The section 7 is adapted to slide horizontally between the guides 6 6; but its lateral movement in one direction is limited by means of the cross-bolts 8, which are located upon the upright 8' at the end of one of the sides 3. Said bolts extend across the path of the said section 7. The gate 9 is also arranged to slide horizontally in the guides 6 6. Means is provided for sliding the gate 9. Said means consists of a lever 10, fulcrumed to the sill 10' of the floor 2 and being attached at an intermediate point to one end of the link 11, the other end of which is pivoted to the side of the gate 9. The pivot-bolt 12 forms the pivotal connection between the gate 9 and the link 11. The edge of the link 11 is provided between its pivotal connections with the gate 9 and lever 10 with the ratchet-teeth 13. The pawl 14 is pivoted to the frame of the device and is adapted to engage the ratchet-teeth 13. The spring 15 connects with the said pawl 14 and tends to keep the same in engagement with the ratchet-teeth 13. The fenders or braces 16 are attached to the reduced end of the body 1 and are inclined with relation to the same and are adapted to bear against the edges of a stock-rack, wagon-body, or car-door for the purpose of properly spacing the device from the wagon or car and at the same time closing the gap resulting from the angle caused by the inclination of the device with relation to the wagon or car. The props 17 are pivoted to the body near the reduced end thereof and are adapted to be swung in vertical planes, and when their free ends are swung down they support the body in an inclined position. When the free ends of the said props are swung up, the said body rests flat upon the ground.

In operation the device is manipulated as follows: To entrap an animal, food or bait is placed in the body, which is permitted to rest flat upon the ground. The gate 9 is open, and when the animal enters the body 1 to get the food the operator closes the gate 9 by moving the lever 10. The pawl 14 will engage the ratchet-teeth 13 of the link 11 and hold the said gate 9 in its closed position. Should it be desired to load the animal thus entrapped upon an elevated wagon-body, the reduced end of the body 1 is elevated and the props 17 are swung down so that their free ends come in contact with the ground. Thus the body 1 is supported in inclined position. The wagon-body is then brought in contact with the fenders 16 (or vice versa) and the gate 9 is opened. The animal is then driven up the inclined floor 2 into the wagon-body. When it is desired to use the device as a holder for the animal during an operation, the neck of the animal or the forward portion of its body is placed in the recesses 18, provided at the inner opposite edges of the section 7 and the gate 9, and the said gate 9 is moved up into close contact with the animal, which is thereby impaled against the section 7. The animal thus being held in position, the operation may be readily performed.

Having described my invention, what I claim as new is—

1. A device of the character described comprising a body, a gate slidably located thereon, a lever fulcrumed to the body, a link connecting said lever with the gate, and a gate-retaining means mounted upon the body and adapted to engage said link.

2. A device of the character described comprising a body, a gate slidably located thereon, a lever fulcrumed to the body, a link pivotally connected at its ends to the gate and the lever and having ratchet-teeth located between its pivotal connections and a spring-actuated pawl pivoted to the body and adapted to engage said ratchet-teeth.

In testimony that I claim the foregoing as my own I have hereto affixed my signature in the presence of two witnesses.

WILLIAM E. WILLHOIT.

Witnesses:
WILLIAM A. MAUPIN,
WILLIAM P. BETHARD.